United States Patent
Kemmochi et al.

(10) Patent No.: US 7,221,922 B2
(45) Date of Patent: May 22, 2007

(54) SWITCH CIRCUIT AND COMPOSITE HIGH FREQUENCY ELEMENTS

(75) Inventors: Shigeru Kemmochi, Saitama-ken (JP); Mitsuhiro Watanabe, Meerbusch (DE); Hiroyuki Tai, Tottori-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 10/545,432

(22) PCT Filed: Feb. 13, 2004

(86) PCT No.: PCT/JP2004/001560

§ 371 (c)(1),
(2), (4) Date: Aug. 12, 2005

(87) PCT Pub. No.: WO2004/073193

PCT Pub. Date: Aug. 26, 2004

(65) Prior Publication Data

US 2006/0211382 A1 Sep. 21, 2006

(30) Foreign Application Priority Data

Feb. 14, 2003 (JP) ............................ 2003-036231

(51) Int. Cl.
*H04B 1/06* (2006.01)

(52) U.S. Cl. .................. 455/277.1; 455/275; 455/273; 455/272; 343/876; 343/777

(58) Field of Classification Search .................. 455/83, 455/550.1, 575.1, 424, 425, 456.5, 456.6, 455/13.3, 19, 82, 78, 84, 575.7, 193.1, 553.1, 455/552.1, 80, 325, 333, 334, 269, 272, 273, 455/275, 277.1, 562.1, 276.1, 63.1, 67.11, 455/67.13, 132, 133; 333/132, 133, 134, 333/193, 126, 103, 124, 203, 219.1, 202, 333/104, 246, 194, 196, 173, 247; 342/434, 342/435; 343/777, 876, 814

See application file for complete search history.

(56) References Cited

U.S. PATENT DOCUMENTS

| | | | | |
|---|---|---|---|---|
| 5,473,293 | A | * | 12/1995 | Chigodo et al. ............. 333/104 |
| 6,060,960 | A | * | 5/2000 | Tanaka et al. ............... 333/104 |
| 6,483,399 | B1 | * | 11/2002 | Atokawa ..................... 333/133 |
| 6,606,015 | B2 | * | 8/2003 | Uriu et al. ................... 333/132 |
| 6,633,206 | B1 | * | 10/2003 | Kato ........................... 333/104 |
| 6,788,958 | B2 | * | 9/2004 | Furutani et al. ......... 455/552.1 |
| 6,856,187 | B2 | * | 2/2005 | Kushitani et al. ........... 327/374 |
| 6,895,228 | B2 | * | 5/2005 | Satoh ....................... 455/168.1 |
| 6,897,738 | B2 | * | 5/2005 | Kato ........................... 333/104 |
| 6,917,258 | B2 | * | 7/2005 | Kushitani et al. ........... 333/103 |
| 6,987,984 | B1 | * | 1/2006 | Kemmochi et al. ...... 455/552.1 |

(Continued)

FOREIGN PATENT DOCUMENTS

JP 10-284901 A 10/1998

(Continued)

*Primary Examiner*—Edward F. Urban
*Assistant Examiner*—Charles Chow
(74) *Attorney, Agent, or Firm*—Sughrue Mion, PLLC

(57) ABSTRACT

A switch circuit for switching the connection of the receiving or transmitting circuits of two communication systems to an antenna circuit, which comprises first and second switch means having two switching elements, the first switch means comprising a first inductance element between a port connected to the antenna circuit and a port connected to the second switch means; the second switch means comprising a second inductance element between a port connected to the first switch means and a port connected to a receiving circuit of a first communication system, and a transmission line constituting the first inductance element having a lower characteristic impedance than that of a transmission line constituting the second inductance element.

7 Claims, 8 Drawing Sheets

U.S. PATENT DOCUMENTS

| | | | |
|---|---|---|---|
| 7,010,273 B2* | 3/2006 | Satoh et al. | 455/83 |
| 7,023,296 B2* | 4/2006 | Uriu et al. | 333/132 |
| 2002/0090974 A1* | 7/2002 | Hagn | 455/552 |
| 2002/0137471 A1* | 9/2002 | Satoh et al. | 455/83 |
| 2002/0183016 A1* | 12/2002 | Kemmochi et al. | 455/83 |
| 2003/0092397 A1* | 5/2003 | Uriu et al. | 455/82 |
| 2003/0181174 A1* | 9/2003 | Takagi | 455/130 |
| 2003/0189910 A1* | 10/2003 | Yamada et al. | 370/335 |
| 2004/0075968 A1* | 4/2004 | Satoh et al. | 361/306.3 |
| 2004/0119560 A1* | 6/2004 | Tsurunari et al. | 333/133 |
| 2004/0203552 A1* | 10/2004 | Horiuchi et al. | 455/333 |
| 2004/0266378 A1* | 12/2004 | Fukamachi et al. | 455/188.1 |
| 2005/0221759 A1* | 10/2005 | Spadafora et al. | 455/41.2 |

FOREIGN PATENT DOCUMENTS

| | | |
|---|---|---|
| JP | 2001-267956 A | 9/2001 |
| JP | 2004-7408 A1 | 1/2004 |
| WO | WO 00/55983 | 9/2000 |

* cited by examiner

SWITCH CIRCUIT AND COMPOSITE HIGH FREQUENCY ELEMENTS

FIELD OF THE INVENTION

The present invention relates to a switch circuit for multi-band mobile phones usable in pluralities of communication systems, and a high-frequency composite part comprising it.

BACKGROUND OF THE INVENTION

As mobile equipments such as mobile phones, etc. have recently been used by remarkably increasing numbers of users, their functions and services have extremely improved. Portable wireless communication systems include EGSM (extended global system for mobile communications) and GSM 1800 (global system for mobile communications 1800) widely used mostly in Europe, GSM 1900 (global system for mobile communications 1900) widely used in the U.S., and PDC (personal digital cellular system) used in Japan, etc. From the aspect of convenience by users and efficient use of communications facilities, multi-band mobile phones such as dual-band or triple-band mobile phones, which can utilize pluralities of communication systems, have been developed.

A multi-band mobile phone can utilize pluralities of systems. As a high-frequency part used in such mobile phones, WO 00/55983 discloses a high-frequency switch module for switching transmitting circuits and receiving circuits in different communication systems. This high-frequency switch module comprises first and second filter circuits having different passbands, a switch circuit connected to the first filter circuit for switching a transmitting circuit and a receiving circuit of a communication system A, and a switch circuit connected to the second filter circuit for switching transmitting circuits of communication systems B, C, a receiving circuit of the communication system B and a receiving circuit of the communication system C.

The first and second filter circuits function as circuits for branching transmitting signals and receiving signals of the communication system A and transmitting signals and receiving signals of the communication systems B, C. The switch circuit is a diode switch comprising a diode and a transmission line as main elements, and any one of pluralities of communication systems A, B, C is selected by controlling the diode in an ON or OFF state by applying voltage from control circuits, thereby switching the antenna and the transmitting circuits and receiving circuits of the communication systems A, B, C.

Specific examples of the communication systems A, B, C are, for instance, GSM, DCS 1800 and PCS. GSM corresponds to the above EGSM, DCS 1800 corresponds to the above GSM 1800, and PCS corresponds to the above GSM 1900. Table 1 shows the transmitting and receiving frequencies of each communication system.

TABLE 1

| Communication System | Transmitting Frequency (MHz) | Receiving Frequency (MHz) |
|---|---|---|
| EGSM | 880 to 915 | 925 to 960 |
| GSM 1800 | 1710 to 1785 | 1805 to 1880 |
| GSM 1900 | 1850 to 1910 | 1930 to 1990 |

As shown in Table 1, the transmitting frequencies of GSM 1800 and GSM 1900 are closer to each other than to that of EGSM. Accordingly, GSM 1800 and GSM 1900 can use a common transmitting signal path in a high-frequency circuit. To switch the transmitting signals and receiving signals of GSM 1800 and GSM 1900, a one-input, three-output switch circuit comprising a common port for the transmitting signals of GSM 1800 and GSM 1900, a receiving port of GSM 1800 and a receiving port of GSM 1900 may be used.

As a one-input, three-output switch circuit, WO 00/55983 discloses a diode switch circuit comprising diodes and transmission lines as main elements (FIG. 13). This diode switch circuit comprises cascade-connected, λ/4-switch circuits, to select a transmission mode of GSM 1800/GSM 1900, a receiving mode of GSM 1800 and a receiving mode of GSM 1900 as shown in Table 2 by controlling voltage applied to control terminals VC2, VC3.

TABLE 2

| Mode | VC2 | VC3 |
|---|---|---|
| GSM 1800 TX (Transmitting) | V+ | 0 |
| GSM 1900 TX (Transmitting) | V+ | 0 |
| GSM 1800 RX (Receiving) | 0 | 0 |
| GSM 1900 RX (Receiving) | 0 | V+ |

Zero voltage is applied to the control terminals VC2 and VC3 at the time of receiving GSM 1800, to turn off diodes DP1, DP2, DD1 and DD2. With the diode DD1 in an OFF state, there is large impedance between a connecting point 1P2 and the transmitting circuit TX1, TX2 of GSM 1800/GSM 1900. With the diode DP1 in an OFF state, there is large impedance between a connecting point IP3 and the receiving circuit RX2 of GSM 1900. Accordingly, the connecting point IP2 is connected to the receiving circuit RX1 of GSM 1800 via two transmission lines ld3 and lp2

Usually, the transmission line ld3 has such length that its resonance frequency is within a frequency range (1710–1910 MHz) of transmitting signals of GSM 1800 and GSM 1900, and the transmission lines lp2 has such length that its resonance frequency is within a frequency range (1930–1990 MHz) of a receiving signal of GSM 1900, with their characteristic impedance designed to be 50Ω.

However, intensive research has revealed that when the switch circuit is formed by strip lines, etc. in a multi-layer substrate, the reduction of size, particularly thickness, of the multi-layer substrate provides a receiving signal output port RX1 of GSM 1800 and a receiving signal output port RX2 of GSM 1900 with impedance of about 70–80Ω, larger than 50Ω, by parasitic capacitance, etc., even though the characteristic impedance of the transmission lines ld3 and lp2 is set at 50Ω, resulting in large loss in receiving signals from the output ports RX1, RX2. WO 00/55983 does not recognize this problem, much less provides any solutions.

OBJECTS OF THE INVENTION

Accordingly, an object of the present invention is to provide a one-input, three-output switch circuit comprising two cascade-connected, one-input, two-output switch circuits for switching the connection of receiving or transmitting circuits of two communication systems to an antenna circuit.

Another object of the present invention is to provide a small high-frequency composite part with low transmission loss comprising such switch circuit in a multi-layer substrate.

DISCLOSURE OF THE INVENTION

The switch circuit of the present invention for switching the connection of the receiving or transmitting circuits of two communication systems to an antenna circuit comprises two switch means having switching elements, a first switch means comprising a first port connected to the antenna circuit, a second port connected to transmitting circuit of first and second communication systems, and a third port connected to a second switch means;

the second switch means comprising a fourth port connected to the third port, a fifth port connected to a receiving circuit of the first communication system, and a sixth port connected to a receiving circuit of the second communication system;

a first switching element being disposed between the first port and the second port;

a first inductance element being disposed between the first port and the third port;

a second switching element being disposed between the third port and a ground;

a third switching element being disposed between the fourth port and the sixth port;

a second inductance element being disposed between the fourth port and the fifth port; and a fourth switching element being disposed between the fifth port and a ground;

the third port being connected to the fourth port via a capacitance element; and a transmission line constituting the first inductance element having a lower characteristic impedance than that of a transmission line constituting the second inductance element.

With the above structure, the impedance of the fifth and sixth ports of the second switch means can be controlled, thereby achieving matching with a receiving circuit connected to each port and thus reducing the transmission loss of a receiving signal.

When the first inductance element is formed by a transmission line such as a strip line, etc. in a multi-layer substrate formed by laminating ceramic sheets, it is preferable to adjust characteristic impedance by a gap between the transmission line and a ground and the width of the transmission line. To provide the transmission line constituting the first inductance element with characteristic impedance lower than 50Ω, the transmission line preferably has an increased width. A wide transmission line has a small characteristic impedance and a reduced resistance, resulting in a further decreased transmission loss.

In the switch circuit of the present invention, the switching elements may be constituted by semiconductor elements such as field effect transistors, bipolar transistors, PIN diodes, etc. The field effect transistor increases or decreases impedance between its source and drain by a control voltage applied from a gate to permit or prohibit the passing of high-frequency signals. The PIN diode increases or decreases impedance between its anode and cathode by a control voltage to permit or prohibit the passing of high-frequency signals. In any case, a switching operation is carried out by changing the impedance.

The inductance elements may be transmission lines such as strip line electrodes, micro-strip line electrodes, etc, coils, chip inductors, etc. The capacitance elements may be laminated capacitors constituted by capacitor electrodes, etc. These elements may be properly selected depending on applications.

In the switch circuit of the present invention, the first and second inductance elements are preferably constituted by transmission lines, and a transmission line constituting the first inductance element is preferably as long as $1/6$ to $1/12$ of the wavelength ($\lambda$) of signals transmitted in the first communication system, and shorter than a transmission line constituting the second inductance element. With such structure, the transmission line can have small resistance and thus reduced transmission loss.

In the switch circuit of the present invention, a capacitance element connecting the third port to the fourth port between the first switch means and the second switch means preferably has capacitance of 10 pF or less. With the capacitance element having such capacitance, the impedance of the fifth and sixth ports of the second switch means can be adjusted. Combined with the adjustment of the characteristic impedance of the first inductance element, the impedance of the fifth and sixth ports can be adjusted in a further wider range.

Impedance matching can be achieved between the transmission line constituting the first inductance element and the transmission line constituting the second inductance element by the capacitance element, whereby the first switch means is connected to the second switch means with good matching. The preferred capacitance of the capacitance element is 2–7 pF.

The high-frequency composite part of the present invention comprises switching elements, capacitance elements and inductance elements constituting the switch circuit, which are mounted onto or contained in a multi-layer substrate formed by laminating pluralities of ceramic sheets, and connected through connecting means formed in the multi-layer substrate, such as via-holes, connecting lines, etc.

In the high-frequency composite part of the present invention, at least part of the transmission line constituting the first inductance element of the switch circuit is preferably wider than the transmission line constituting the second inductance element, thereby making the first inductance element have lower characteristic impedance than that of the second inductance element. At least part of the transmission lines constituting the first and second inductance elements are preferably formed in a region sandwiched by ground electrodes in the multi-layer substrate.

BEST MODE FOR CARRYING OUT THE INVENTION

[1] Circuit Structure

Figure 1:
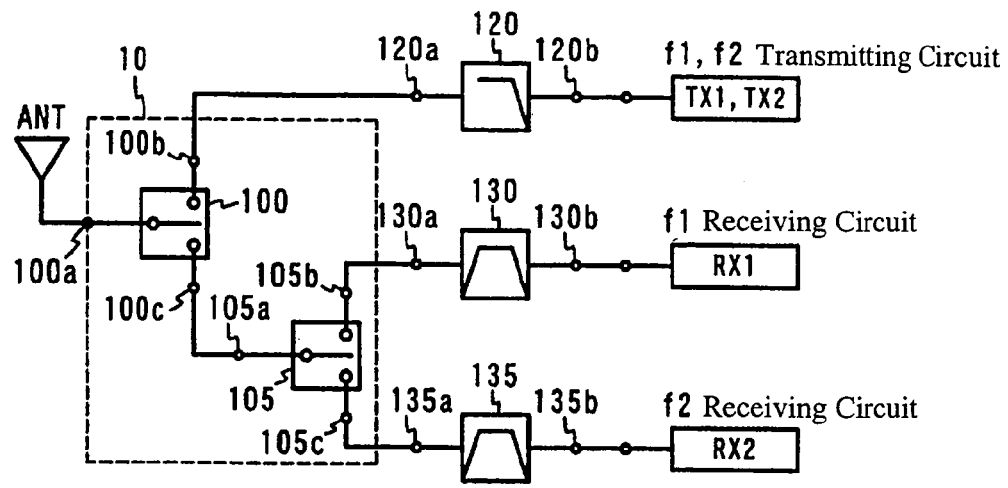
FIG. 1 is a block diagram showing a high-frequency circuit comprising a switch circuit according to one embodiment of the present invention.
Figure 2:
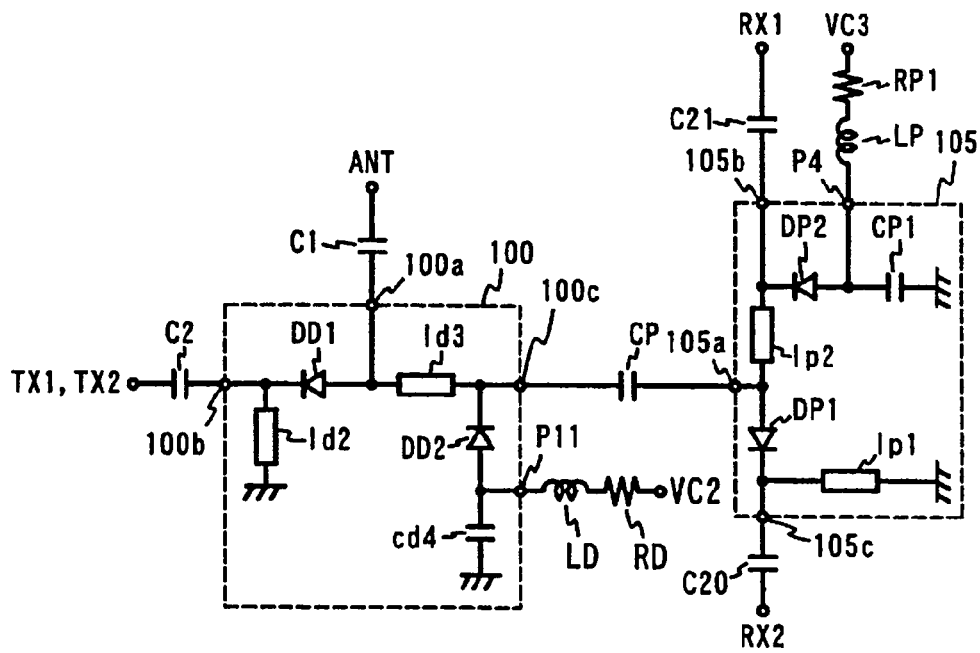
FIG. 2 is a view showing an equivalent circuit of the switch circuit according to one embodiment of the present invention.

FIG. 1 shows a high-frequency circuit comprising a switch circuit 10 according to one embodiment of the present invention, and FIG. 2 shows an equivalent circuit of the switch circuit 10. For the simplification of explanation, it is assumed that pluralities of communication systems are GSM 1800 (transmitting frequency: 1710–1785 MHz, receiving frequency: 1805–1880 MHz) as a first communication system f1, and GSM 1900 (transmitting frequency: 1850–1910 MHz, receiving frequency: 1930–1990 MHz) as a second communication system f2, though the present invention is of course not restricted thereto.

This switch circuit 10 comprising switching elements, inductance elements and capacitance elements is constituted by a first switch means 100 and a second switch means 105. The first switch means 100 comprises a first port 100a connected to an antenna circuit, a second port 100b connected to transmitting circuit TX1,TX2 of GSM 1800 and GSM 1900, and a third port 100c connected to the second switch means 105. The second switch means 105 comprises a fourth port 105a connected to the first switch means 100 via a capacitance element CP, a fifth port 105b connected to a receiving circuit RX1 of GSM 1800, and a sixth port 105c connected to a receiving circuit RX2 of GSM 1900.

The second switch means 105 comprises a transmission line lp2 as a second inductance element between the fourth port 105a and the fifth port 105b, a diode DP2 as a fourth switching element between the fifth port 105b and a ground, a capacitor CP1 between the fourth diode DP2 and a ground, a diode DP1 as a third switching element between the fourth port 105a and the sixth port 105c, and a transmission line lp1 or an inductor between the sixth port 105c and a ground. A control circuit VC3 is connected between the diode DP2 and the capacitor CP1 via an inductor LP and a resistor RP1. The transmission line lp2 is set at 50Ω for matching with the characteristic impedance of an external circuit.

Disposed upstream of the second switch means 105 is the first switch means 100 for switching the transmitting circuit TX1, TX2 of GSM 1800/GSM 1900 and the second switch means 100. The first switch means 100 comprises two diodes DD1, DD2 and transmission lines ld2, ld3 (or an inductor in place of the transmission line ld2) as main elements.

Disposed between the first port 100a and the second port 100b is the diode DD1 as the first switching element, which has an anode connected to the first port 100a, and a cathode connected to the grounded transmission line ld2. Connected between the first port 100a and the third port 100c is a transmission line ld3 as the first inductance element, and a diode DD2 as the second switching element grounded via a capacitor cd4 is disposed on the side of the third port 100c. A control circuit VC2 is connected between the diode DD2 and the capacitor cd4 via an inductor LD and a resistor RD.

The characteristic impedance of the transmission line ld3 is 35–45 Ω, lower than that of the transmission lines lp2. The first switch means 100 and the second switch means 105 are connected with good matching by the capacitance element CP. The length of a transmission line ld3 constituting the first inductance element is ⅙–1/12 of the wavelength (λ) of a transmitting signal of GSM 1800, shorter than a transmission line lp2 constituting the second inductance element.

A control logic of the control circuits VC2, VC3 for operating the switch circuit may be the same as shown in Table 2. With the switching elements controlled in an ON or OFF state by voltage applied from the control circuits, transmission modes of GSM 1800/GSM 1900, a receiving mode of GSM 1800 or a receiving mode of GSM 1900 can be selected. The operation of the switch circuit will be explained in detail below.

(A) Receiving Mode of GSM 1800

When the receiving circuit RX1 of GSM 1800 is connected to the antenna circuit ANT, a zero voltage is applied from the control circuits VC2 and VC3 to hold the diodes DP1, DP2, DD1, DD2 in an OFF state. With the diode DD1 in an OFF state, there is large impedance between the first port 100a and the second port 100b. With the diode DP1 in an OFF state, there is large impedance between the fourth port 105a and the sixth port 105c. As a result, a receiving signal of GSM 1800 input through the antenna is transmitted to a receiving circuit RX1 of GSM 1800 via the transmission lines ld3, lp2 with low loss, without leaking to the transmitting circuit TX1, TX2 of GSM 1800/GSM 1900 and the receiving circuit RX2 of GSM 1900.

(B) Receiving Mode of GSM 1900

When the receiving circuit RX2 of GSM 1900 is connected to the antenna circuit ANT, a zero voltage is applied from the control circuit VC2, and a positive voltage is applied from the control circuit VC3. The positive voltage from the control circuit VC3 is applied to the second switch means 105 including the diodes DP1, DP2 with its DC component eliminated by capacitors C20, C21, CP1, CP. As a result, the diodes DP1 and DP2 are turned on. With the diode DP1 in an ON state, there is low impedance between the fourth port 105a and the sixth port 105c. With the diode DP2 and the capacitor CP1 in an ON state, the transmission line lp2 is grounded at high frequencies, resonance occurs in a frequency band of receiving signal of GSM 1900, resulting in extremely large impedance in a receiving signal band of GSM 1900 when the fifth port 105b is viewed from the fourth port 105a. Further, with the diode DD1 in an OFF state, there is large impedance between the first port 100a and the second port 100b. As a result, the receiving signal of GSM 1900 input through the antenna is transmitted to the receiving circuit RX2 of GSM 1900 with low loss, without leaking to the transmitting circuit TX1, TX2 of GSM 1800/ GSM 1900 and the receiving circuit RX1 of GSM 1800.

(C) Transmission Mode of GSM 1800/GSM 1900

When the transmitting circuit TX1, TX2 of GSM 1800 and GSM 1900 are connected to the antenna circuit ANT, a zero voltage is applied from the control circuit VC3, and a positive voltage is applied from the control circuit VC2. The positive voltage from the control circuit VC2 is applied to the first switch means 100 including the diodes DD1, DD2 with its DC component eliminated by capacitors Cl, C2, cd4, CP. As a result, the diodes DD1, DD2 are turned on. With the diode DD1 in an ON state, there is small impedance between the second port 100$b$ and the first port 100$a$. Also, with the diode DD2 and the capacitor cd4 in an ON state, the transmission line ld3 is grounded at high frequencies, resulting in resonance. As a result, impedance is large at the third port 100$c$ when viewed from the first port 105$a$. Transmission signals from the transmitting circuit of GSM 1800 and GSM 1900 are sent to the antenna circuit ANT without leaking to the receiving circuit. If the transmission line ld3 were short, there would not be sufficiently large impedance when the third port 100$c$ is viewed from the first port 100$a$, resulting in the leak of a transmitting signal to the receiving circuit. Accordingly, the transmission line ld3 is preferably as long as λ/12 or more.

Figure 6:
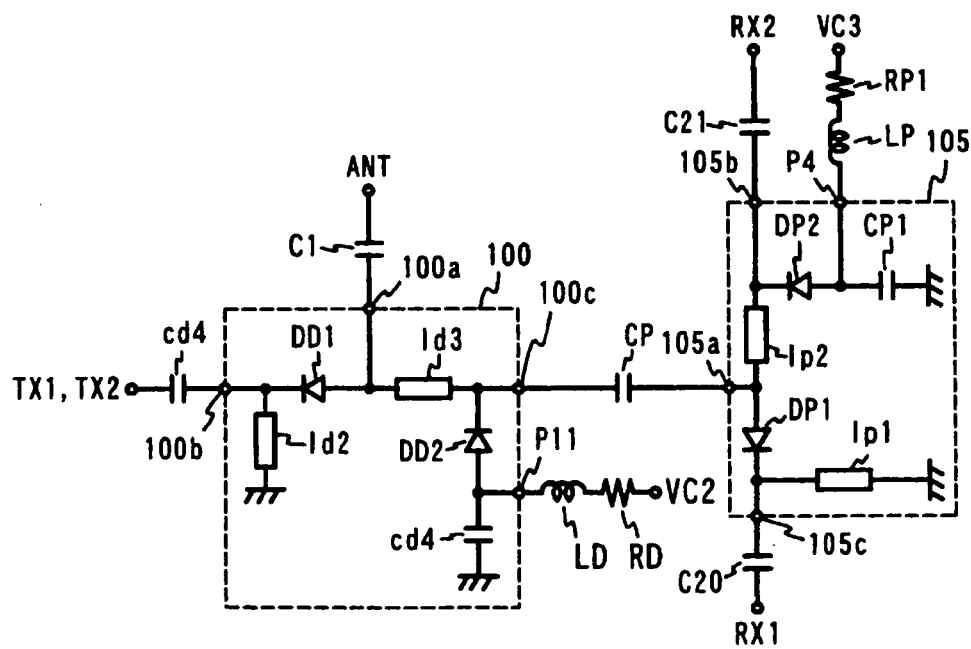
FIG. 6 is a view showing an equivalent circuit of the switch circuit according to another embodiment of the present invention.

FIG. 6 shows an equivalent circuit of the second switch means, in which the connection of the receiving circuits of GSM 1800 and GSM 1900 to the fifth and sixth ports is opposite to that in the first embodiment. A control logic in this case is shown in Table 3.

TABLE 3

| Mode | VC2 | VC3 |
|---|---|---|
| GSM 1800 TX (Transmitting) | V+ | 0 |
| GSM 1900 TX (Transmitting) | V+ | 0 |
| GSM 1800 RX (Receiving) | 0 | V+ |
| GSM 1900 RX (Receiving) | 0 | 0 |

Figure 3:
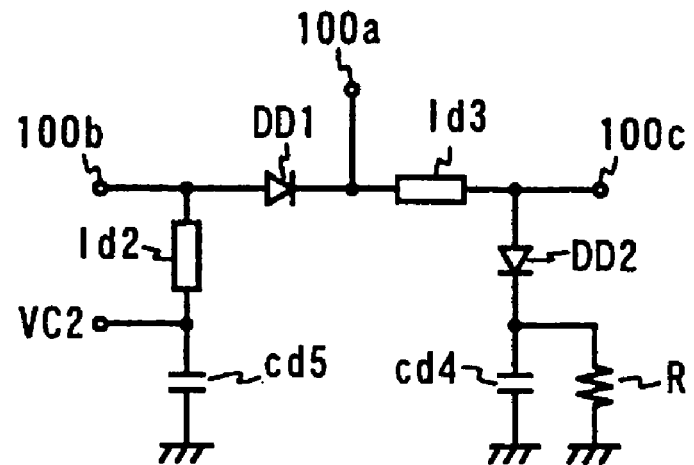
FIG. 3 is a view showing an equivalent circuit of a switch means used in the switch circuit according to another embodiment of the present invention.
Figure 4:
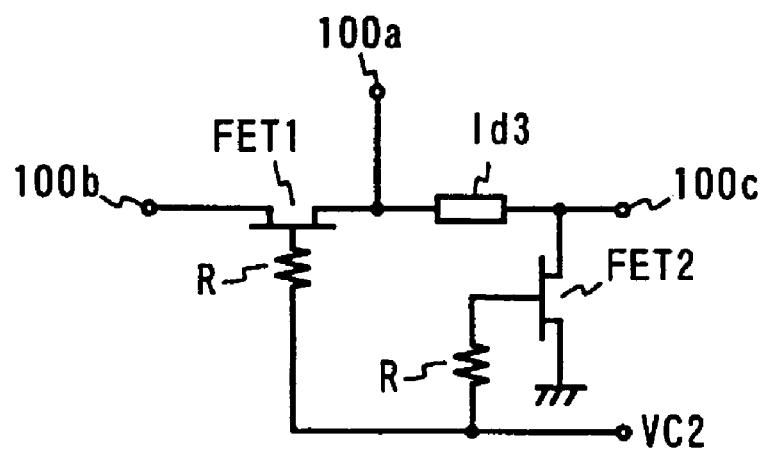
FIG. 4 is a view showing an equivalent circuit of a switch means used in the switch circuit according to another embodiment of the present invention.

FIGS. 3 and 4 show equivalent circuits of other examples of the first switch means 100 and the second switch means 105. FIG. 3 shows an equivalent circuit in which a diode is used as a switching element, and FIG. 4 shows an equivalent circuit in which a transistor is used as a switching element. Reference numerals assigned in both figures are the same as in the first switch means.

This switch circuit can switch signal paths by voltage applied from the control terminal VC2 like the above switch circuit. Incidentally, a control logic is different between a depression type and an enhancement type in the transistors FET1, FET2. Used in the operation according to the control logic shown in Table 2 is an enhancement-type FET, in which impedance between a source and a drain is low when voltage is applied to a gate. With such switch circuit, the same effects as above can be obtained.

[2] Laminate Structure

Figure 7:
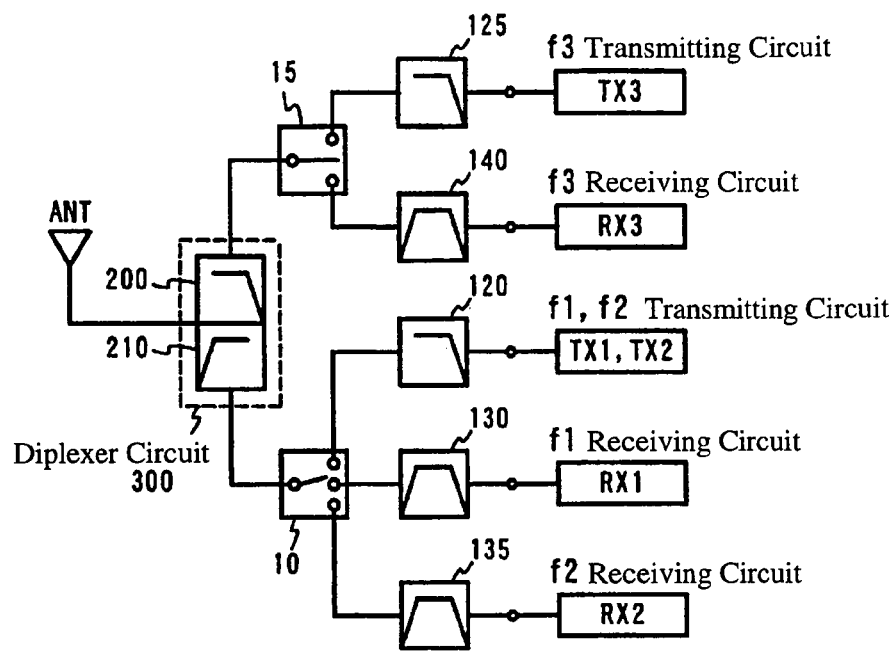
FIG. 7 is a block diagram showing another example of a high-frequency circuit comprising the switch circuit according to one embodiment of the present invention.
Figure 9:
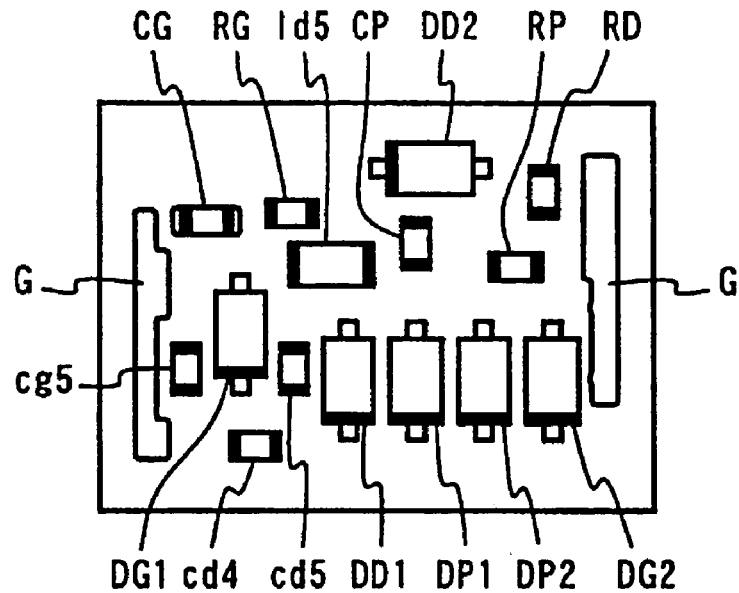
FIG. 9 is a plan view showing a high-frequency composite part comprising the switch circuit according to one embodiment of the present invention.
Figure 10:
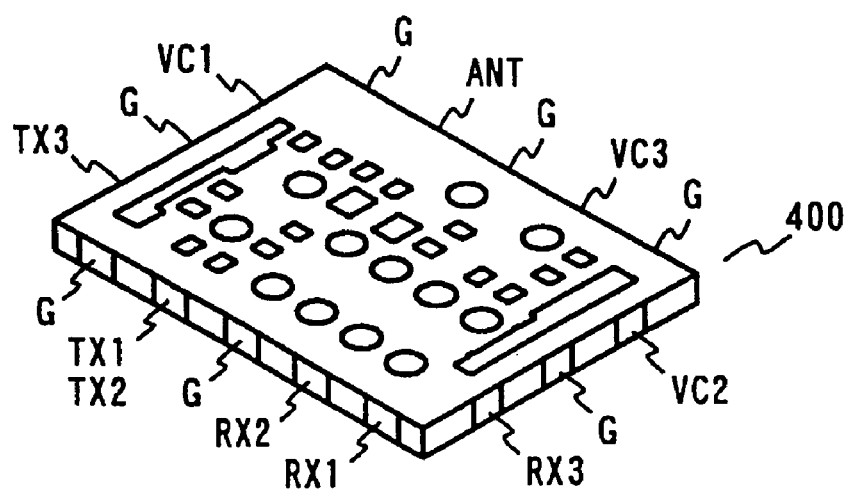
FIG. 10 is a perspective view showing a multi-layer substrate used in the high-frequency composite part of FIG. 9.
Figure 11:
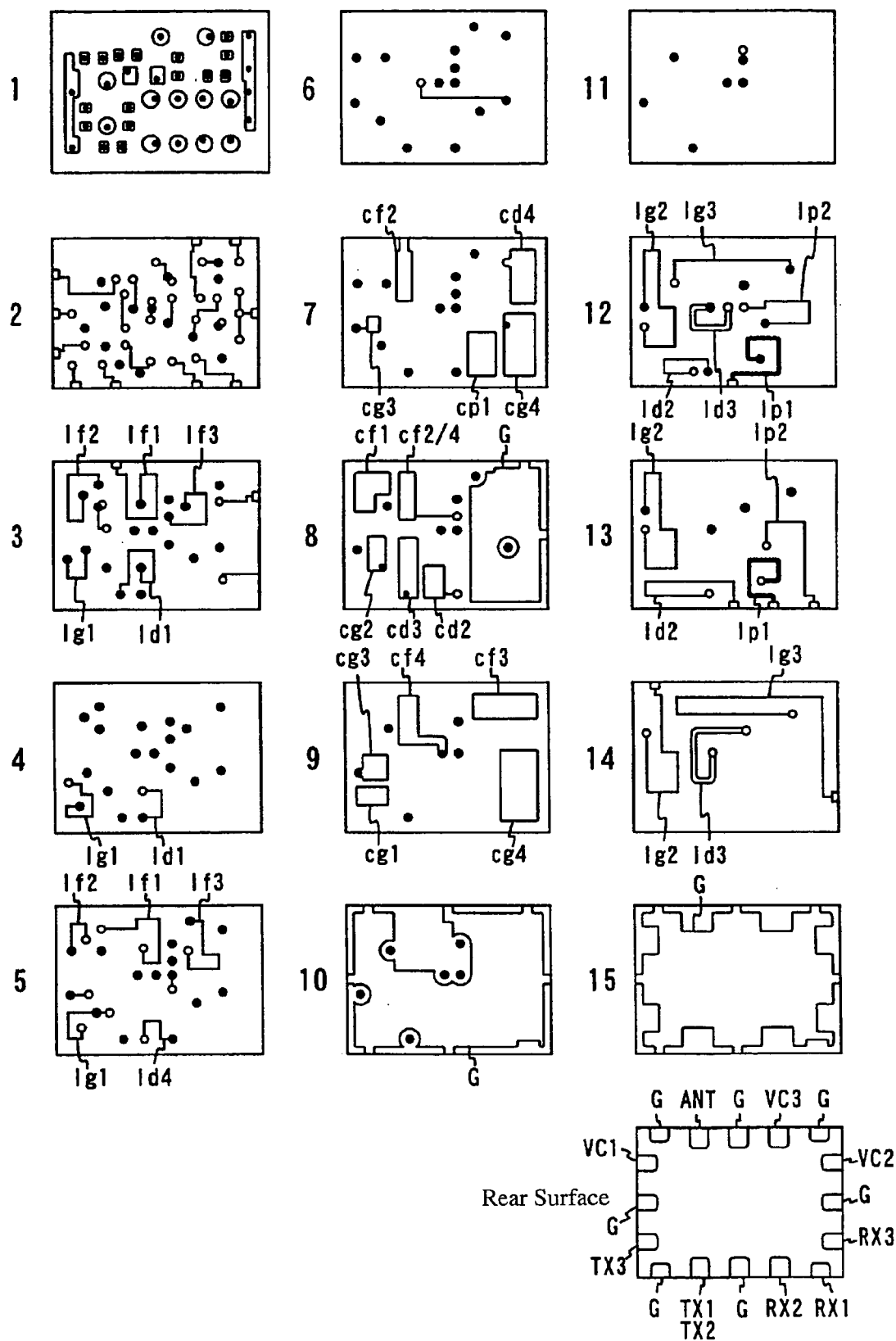
FIG. 11 is an exploded plan view showing sheets constituting the multi-layer substrate used in the high-frequency composite part of FIG. 9.
Figure 12:
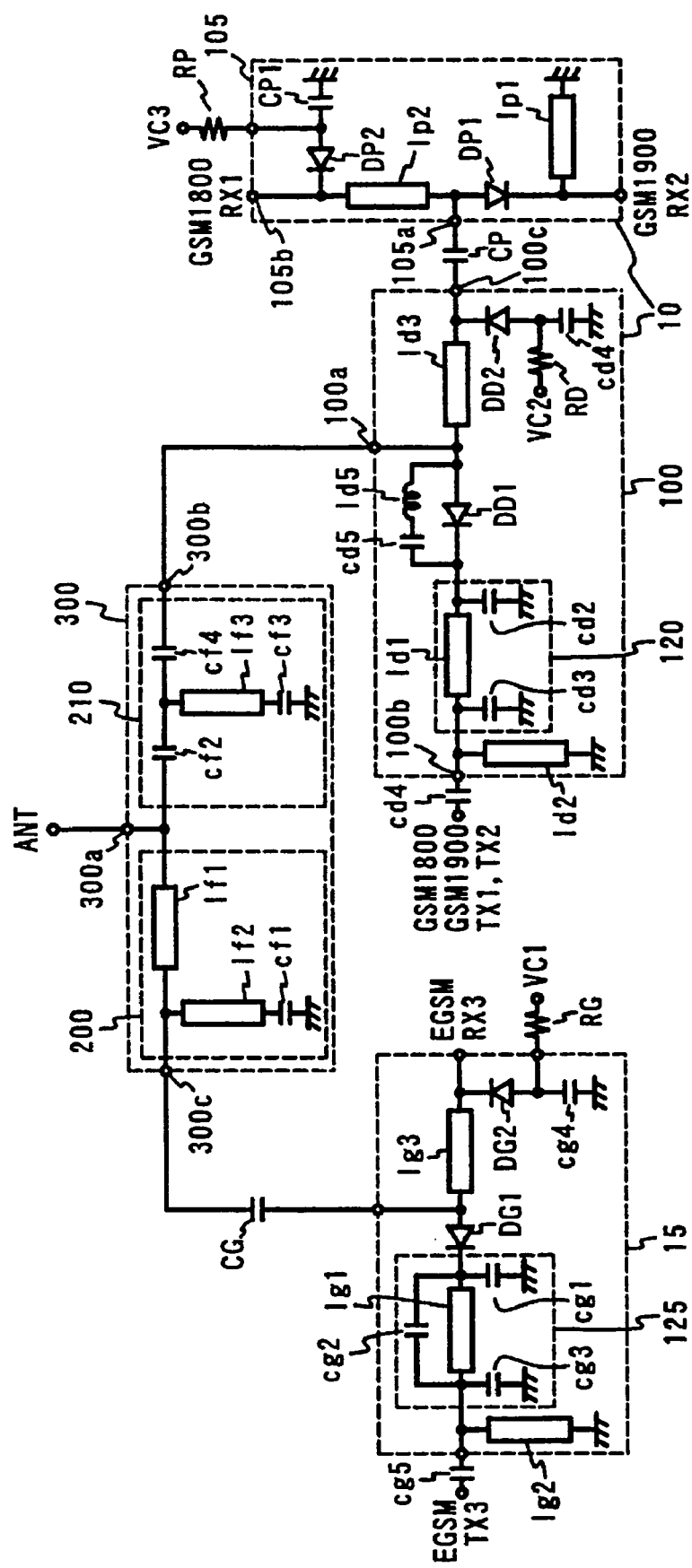
FIG. 12 is a view showing an equivalent circuit of the high-frequency composite part of FIG. 9.
Figure 13:
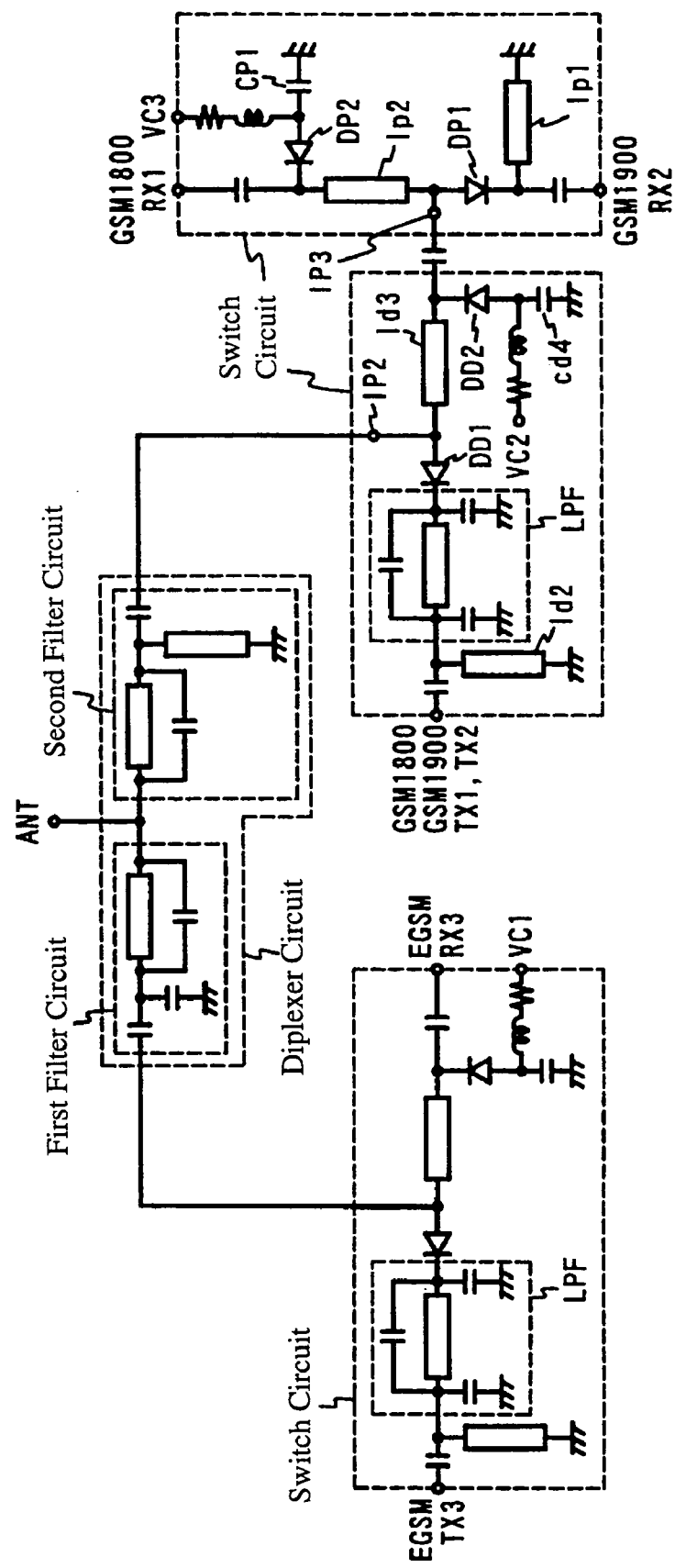
FIG. 13 is a view showing an equivalent circuit of a conventional switch circuit.

FIG. 7 shows a high-frequency composite part (multi-band antenna switch module) handling three communication systems, which comprises, in addition to the switch circuit 15 of the present invention, a diplexer circuit 300 and filter circuits 120, 125, 130, 135, 140 such as lowpass filters, bandpass filters, etc. in and on the multi-layer substrate. FIG. 9 is its plan view, FIG. 10 is a perspective view showing the multi-layer substrate, FIG. 11 is a development showing layers constituting the multi-layer substrate of FIG. 10, and FIG. 12 is a view showing an equivalent circuit of the high-frequency composite part.

In this embodiment, inductance elements, capacitance elements and switching elements for the switch circuit 10 are formed in the multi-layer substrate, together with inductance elements, capacitance elements and switching elements constituting the diplexer circuit 300 comprising first and second filter circuits 200, 210, lowpass filter circuits 120, 125, and a switch circuit 15 in the high-frequency circuit shown in FIG. 7. The other filter circuits 130, 135, 140 are mounted onto the multi-layer substrate as SAW filters or FBAR filters.

Transmission lines as inductance elements are formed in the multi-layer substrate, and diodes and high-capacitance capacitors that cannot be contained in the laminate are mounted as switching elements and chip capacitors, respectively, onto the laminate, to constitute a one-chip, triple-band, high-frequency composite part.

The multi-layer substrate constituting this high-frequency composite part can be produced by forming green sheets of a low-temperature-cofirable, dielectric ceramic as thick as 40 μm to 200 μm, printing an Ag-based conductive paste on each green sheet to form a desired electrode pattern, and integrally laminating pluralities of green sheets having the desired electrode patterns, and sintering the resultant laminate. Line electrodes constituting the transmission lines are preferably mostly as wide as 100 μm to 400 μm. The low-temperature-cofirable, dielectric ceramics may be, for instance, (a) ceramics comprising $Al_2O_3$ as a main component, and at least one of $SiO_2$, SrO, CaO, PbO, $Na_2O$ and $K_2O$ as an auxiliary component, (b) ceramics comprising $Al_2O_3$ as a main component, and at least one of MgO, $SiO_2$ and GdO as an auxiliary component, (c) ceramics comprising $Al_2O_3$, $SiO_2$, SrO, $Bi_2O_3$ and $TiO_2$ as main components, etc.

Laminated green sheets are integrally compression-bonded, and sintered at a temperature of about 900° C., to provide a multi-layer substrate having a outer dimension of 6.7 mm×5.0 mm×1.0 mm, for instance. This multi-layer substrate is provided with terminal electrodes on its side surfaces. The terminal electrodes may be formed at properly selected positions on the bottom surface.

FIG. 11 shows the internal structure of the multi-layer substrate. Reference numerals of parts in FIG. 11 are in agreement with those of the corresponding parts in the equivalent circuit of FIG. 12. The first and second transmission lines ld3, lp2 constituting inductance elements in the switch circuit 10 of the present invention are formed in a region sandwiched by a ground electrode G on a 10-th layer and a ground electrode G on a 15-th layer, together with other transmission lines lp1, ld2 constituting the switch circuit 10 and transmission lines lg2, lg3 constituting the switch circuit 15 of SPDT. Electrode patterns constituting the first and second transmission lines ld3, lp2 are formed on a 12-th layer to a 14-th layer and connected through via-holes (shown by black circles in the figure). The transmission lines are formed in horizontally different regions such that they do not overlap in a lamination direction. With such structure, interference can be prevented between electrode patterns constituting other circuit elements and the transmission lines, resulting in improved isolation characteristics. Each transmission line can be made shorter by having a spiral shape.

With the electrode pattern constituting the first transmission line ld3 wider than the electrode pattern constituting the second transmission line lp2, the characteristic impedance of the first transmission line ld3 lower than that of the second transmission line lp2, and impedance matched by the capacitance element CP connecting the first switch means 100 and the second switch means 105, the impedance of the receiving signal output port RX1 of GSM 1800 and the receiving signal output port RX2 of GSM 1900 is adjusted to substantially 50Ω.

In this example, the first transmission line ld3 was as wide as 0.25 mm, about 2 times as wide as the second transmission line lp2, so that the characteristic impedance of ld3 was lower than that of lp2. The capacitance element CP was 3 pF.

Figure 5:
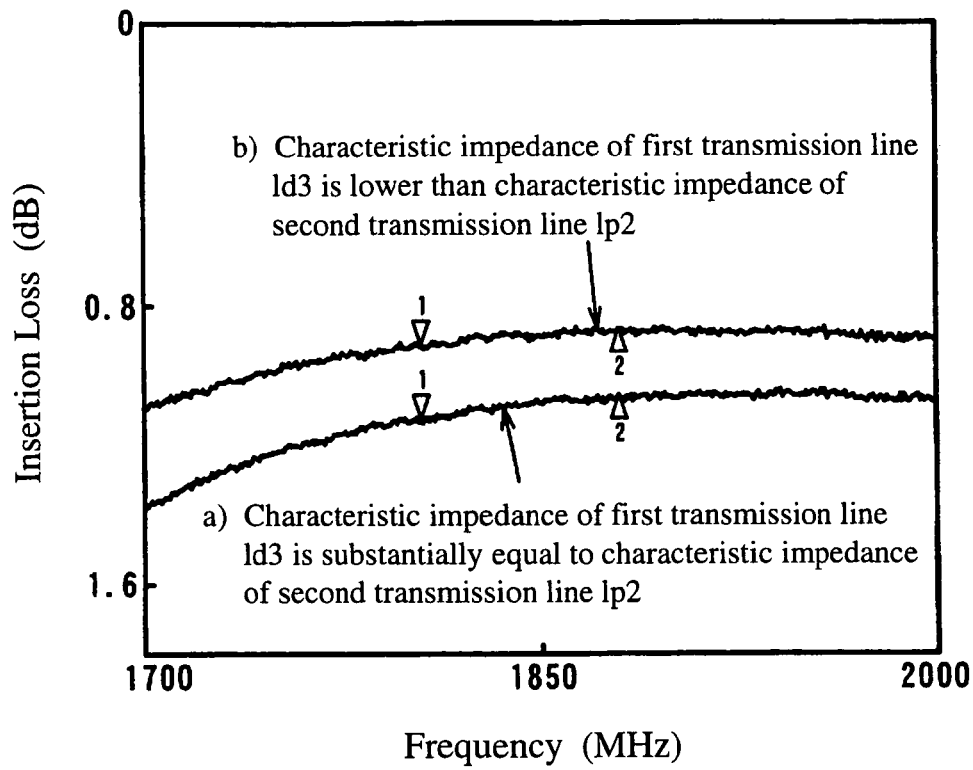
FIG. 5 is a graph showing transmission characteristics at the time of receiving in GSM 1800 in the switch circuit according to one embodiment of the present invention.

FIG. 5 shows insertion loss at the time of the receiving mode of GSM 1800. (a) indicates a case where both ld3 and lp2 had a characteristic impedance of substantially 50Ω, and (b) indicates a case where the characteristic impedance of the transmission line ld3 was lower than that of the transmission lines lp2 (substantially 50Ω). In this example, the insertion loss was improved by about 0.2 dB. Insertion loss at the time of the receiving mode of GSM 1900 was also improved by about 0.2 dB. With such constitution, a high-frequency composite part having excellent isolation characteristics and transmission loss characteristics can be obtained.

Figure 8:
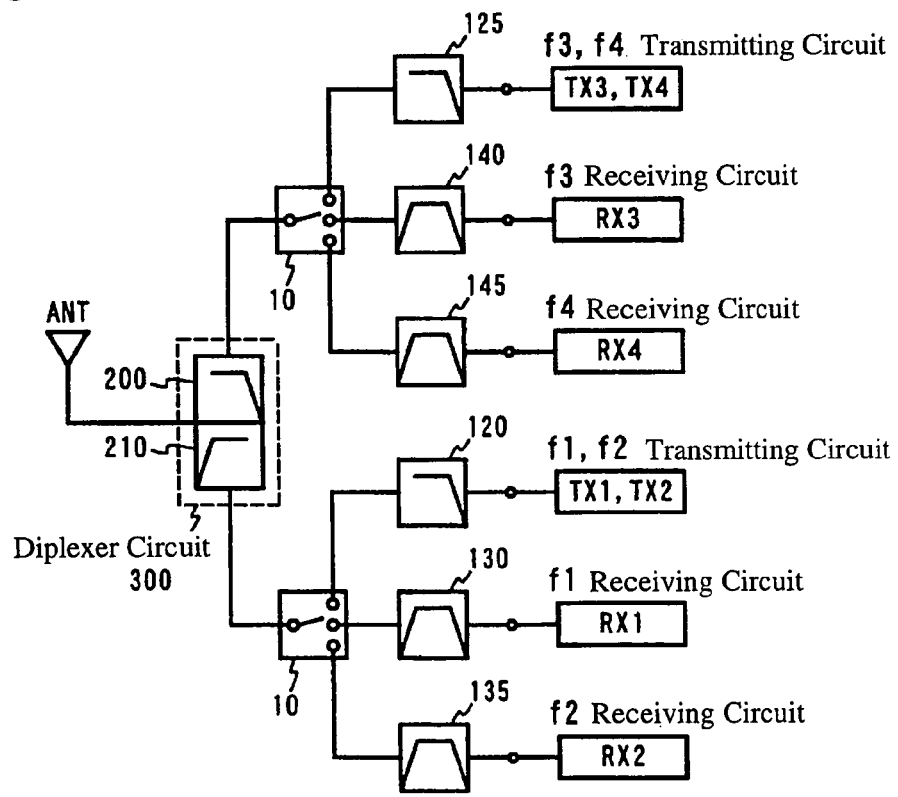
FIG. 8 is a block diagram showing a further example of a high-frequency circuit comprising the switch circuit according to one embodiment of the present invention.

Though the specific examples of the switch circuit have been explained above, the switch circuit of the present invention is not restricted thereto, and various modifications may be made without deviating from the scope of the present invention. Communication systems used in the switch circuit of the present invention are not restricted to those in the above embodiments. It is applicable, for instance, to a combination of GSM 850 (transmitting frequency: 824–849 MHz, receiving frequency: 869–894 MHz) and EGSM (transmitting frequency: 880–915 MHz, receiving frequency: 925–960 MHz), and to high-frequency circuit blocks handling four different communication systems as shown in FIG. 8.

What is claimed:

1. A switch circuit for switching the connection of receiving or transmitting circuits of first and second communication systems, having respective first and second transmitting frequencies which are closer to each other than they are to a transmitting frequency of a third communication system, to an antenna circuit, which comprises two switch means having switching elements,
a first switch means comprising a first port connected to said antenna circuit, a second port connected to a transmitting circuit of said first and second communication systems, and a third port connected to a second switch means;
said second switch means comprising a fourth port connected to said third port, a fifth port connected to a receiving circuit of said first communication system, and a sixth port connected to a receiving circuit of said second communication system;
a first switching element being disposed between said first port and said second port;
a first inductance element being disposed between said first port and said third port;
a second switching element being disposed between said third port and a ground;
a third switching element being disposed between said fourth port and said sixth port;
a second inductance element being disposed between said fourth port and said fifth port; and
a fourth switching element being disposed between said fifth port and a ground;
said third port being connected to said fourth port via a capacitance element; and
a transmission line constituting said first inductance element having a lower characteristic impedance than that of a transmission line constituting said second inductance element.

2. The switch circuit according to claim 1, wherein the transmission line constituting said first inductance element is as long as λ/6 to λ/12 relative to the wavelength (μ) of signals transmitted in the first communication system, and shorter than the transmission line constituting said second inductance element.

3. The switch circuit according to claim 1, wherein the capacitance element connected between said third port and said fourth port has capacitance of 10 pF or less.

4. A high-frequency composite part comprising the switch circuit recited in claim 1, wherein said switching elements, said capacitance elements and said inductance elements are mounted onto or contained in a multi-layer substrate formed by laminating pluralities of ceramic sheets, and connected by connecting means formed in said multi-layer substrate.

5. The high-frequency composite part according to claim 4, wherein at least part of the transmission line constituting the first inductance element of said switch circuit is wider than the transmission line constituting the second inductance element.

6. The high-frequency composite part according to claim 4, wherein at least parts of the transmission lines constituting said first inductance element and said second inductance element are formed in a region sandwiched by ground electrodes in said multi-layer substrate.

7. The switch circuit according to claim 1, wherein:
the transmitting frequency of said first communication system is in the range of 1710 to 1785 MHz;
the transmitting frequency of said second communication system is in the range of 1850 to 1910 MHz; and
the transmitting frequency of said third communication system is in the range of 880 to 950 MHz.

* * * * *